3,340,079
METHOD OF INCREASING THE VISCOSITY OF MAGNESIA CEMENTS

Burl E. Bryant, Denton, Tex., assignor to The Dow Chemical Company, Midland, Mich., a corporation of Delaware
No Drawing. Filed Apr. 15, 1964, Ser. No. 360,081
2 Claims. (Cl. 106—105)

This invention relates to a method for preparing high viscosity magnesia cements and, more particularly, is concerned with a method for increasing the viscosity of slurries of magnesia cements by the treatment of ultrasonic energy therewith without any alteration of the composition of said cements.

The viscosity of freshly made magnesia cements remains relatively constant for about one hour at 25° C., at which time the viscosity begins to increase. Prior to this one hour period, the viscosities of magnesia cements are often too low to allow the use thereof in plaster, as a mortar, as a binder, for aggregate, or for molding purposes. The known methods of increasing the viscosity of these cements during this one hour period for these uses include the addition of thickening agents thereto such as silica flour and water-soluble thickeners.

I have unexpectedly discovered the method of the instant invention which makes possible a high viscosity magnesia cement without the addition of any diluent thereto and within minutes after mixing.

Thus, it is a principal objects of the present invention to provide a new and novel method for preparing high viscosity magnesia cement.

An additional object is to provide a method for preparing high viscosity magnesium oxychloride, magnesium oxysulfate and combinations of magnesium oxychloride and magnesium oxysulfate cements by the treatment of ultrasonic energy therewith and without the addition of any diluent thereto.

A further object is to provide a method for making high viscosity magnesia cements whereby within minutes after mixing of the ingredients of the cement, a slurry of plaster-like consistency can be prepared.

Other uses, objects and advantages of the instant invention will become apparent from reading the detailed description thereof disclosed hereinafter.

In accordance with the instant invention, I have unexpectedly discovered that if an aqueous slurry of a magnesia cement is submitted to treatment with ultrasonic radiation, its viscosity is markedly increased.

The ultrasonic energy treatment is conducted using ultrasonic generators wherein intensities ranging from about 25 to about 110 watts per square centimeter at frequencies ranging from 20 to about 100 kilocycles per second for a period of time of from about 1 to about 30 minutes are used. The actual intensity of ultrasonic radiation to be employed varies directly with the viscosity of the cement. To illustrate, with starting slurries of lower viscosities, lower intensities should be employed. Preferably, frequencies of from about 20 to about 50 kilocycles per second for a period of from about 2 to about 20 minutes are used.

Ultrasonic generators suitable for use herein include, for example, flow-type devices such as ultrasonic sirens and whistles, piston devices such as the piezoelectric transducer type, the magnetorestrictive type, electromagnetic type, tuning forks and mechanically excited systems.

Substantially any slurry of a magnesia cement containing magnesium oxide, water, magnesium chloride and/or magnesium sulfate, capable of setting to a hardened cement is increased in viscosity by this ultrasonic energy treatment. In particular, slurries of magnesium oxychloride cement containing magnesium oxide, magnesium chloride and water such that the mole ratios of $$MgO/MgCl_2/H_2O$$

are from about 2 to 8/1 to 3/8 to 15 and preferably 5/1/10 are especially suitable in the present process. Slurries of magnesium oxysulfate for use herein should contain magnesium oxide, magnesium sulfate and water such that the mole ratios of $MgO/MgSO_4/H_2O$ are from about 3 to 15/0.5 to 3/6 to 15, and preferably, 11/1/11. Mixed compositions of magnesium oxide, water, magnesium chloride and magnesium sulfate such that the mole ratios of $MgO/MgCl_2/MgSO_4/H_2O$ are from about 2 to 15/0.1 to 8/0.1 to 3/6 to 15 are especially suitable for use herein.

By the present novel process, the viscosity (measured in centipoises) of the slurry of magnesia cement may be increased anywhere from about twice to about one hundred times the normal viscosity of the same slurry not submitted to treatment with ultrasonic radiation. The actual viscosity increase obtained is dependent somewhat on the intensity of the ultrasonic radiation and the age of the slurry.

The following examples are merely illustrative of the instant invention and are not meant to limit it thereto.

Example 1

About 1204 grams of 20 percent magnesium sulfate solution and about 887 grams of magnesium oxide were mixed together. The resulting slurry was divided into two equal portions, one of which was used as a control. A transducerized probe of a Branson Model S-75 (piezoelectric type) Sonifier was immersed into the second sample. This ultrasonic generator was operated at full intensity (i.e., at about 75 watts per square centimeter) for about five minutes. At the end of this time, the temperature of the radiated sample was about 29° C., while the temperature of the control was 23° C. The temperature of the radiated sample was lowered to 23° C. to match that of the control by means of a cooling bath. The viscosity of the slurries was measured with a Brookfield Viscometer, Model LVF. Table I, below, shows the measured viscosity (in centipoises), temperature and age of the slurry at the time of viscosity measurement of both the control sample and the radiated sample, i.e., the sample receiving ultrasonic energy treatment.

TABLE I

| Control Sample | | | Ultrasonic Radiated Sample | | | |
|---|---|---|---|---|---|---|
| Age of Slurry in Minutes | Temperature (° C.) | Viscosity (centipoises) | Age of Slurry in Minutes | Radiation Time (minutes) | Temperature (° C.) | Viscosity (centipoises) |
| 7 | 23 | 257 | 7 | 0 | 23 | 257 |
| 14 | 23 | 265 | 18 | 5 | 23 | 1,150 |
| 44 | 23 | 320 | 38 | 5 | 23.5 | 1,150 |
| 64 | 23 | 510 | 48 | 5 | 24 | 1,360 |
| 78 | 25 | 660 | 58 | 5 | 24 | 9,550 |

Example 2

In this example, a magnesium oxychloride slurry was prepared and received ultrasonic treatment as follows:

ment for a total of twenty minutes in the manner previously described in Examples 1 and 2. Table III, below, illustrates the results of this experiment.

TABLE III

| Control Sample | | Ultrasonic Radiated Sample | | |
|---|---|---|---|---|
| Age of Slurry in Minutes | Viscosity (centipoises) | Age of Slurry in Minutes | Radiation Time (minutes) | Viscosity (centipoises) |
| 3 | 59 | 2 | 0 | 66 |
| 10 | 58 | 12 | 10 | 368 |
| 20 | 59 | 22 | 20 | 960 |
| 30 | 65 | 33 | 20 | 1,280 |
| 40 | 81 | 62 | 20 | 5,000 |
| 70 | 457 | | | |

About 800 grams of magnesium oxide and about 1524 grams of a 25 percent magnesium chloride solution were mixed together and the resulting slurry was divided into two equal portions. One portion was used as a control and the other portion received five minutes of full intensity (75 watts per square centimeter) treatment (as in Example 1) with the Branson Model S–75 Sonifier. The temperature of the radiated sample was lowered from 29° C. to about 23° C. to match the temperature of the control sample. Viscosities of the control and irradiated samples after standing for various periods were measured with a Brookfield viscometer, Model LVF. Table II, below, illustrates the markedly increased viscosity in the treated sample over the control.

It is seen that in each case (i.e., in each example), the effect of the ultrasonic energy on the magnesia cement is to sharply increase the viscosity of the slurry.

Various modifications may be made in the instant invention without departing from the spirit or scope thereof for it is to be understood that I only limit myself as defined in the appended claims.

What is claimed is:

1. A method for increasing the viscosity of slurries of magnesia cements which comprises treating a slurry of the magnesia cement with ultrasonic energy of a magnitude within the range of from about 20 to about 100 kilocycles per second at intensities within the range of from about 25 to about 110 watts per square centimeter for a period of from about 1 to about 30 minutes.

2. The method in accordance with claim 1 wherein the magnesia cements are selected from the group consisting of
    (1) magnesium oxide, magnesium chloride, and water;
    (2) magnesium oxide, magnesium sulfate, and water; and
    (3) magnesium oxide, magnesium sulfate, magnesium chloride, and water.

TABLE II

| Control Sample | | | Ultrasonic Radiated Sample | | | |
|---|---|---|---|---|---|---|
| Age of Slurry in Minutes | Temperature (° C.) | Viscosity (centipoises) | Age of Slurry in Minutes | Radiation Time (minutes) | Temperature (° C.) | Viscosity (centipoises) |
| 7 | 23 | 70 | 7 | 0 | 23 | 70 |
| 32 | 23.5 | 60 | 16 | 5 | 23 | 310 |
| 52 | 23.5 | 60 | 36 | 5 | 23.5 | 265 |
| 92 | 24 | 60 | 96 | 5 | 24.5 | 285 |
| 122 | 24 | 80 | 116 | 5 | 25 | 350 |
| 142 | 24 | 140 | 136 | 5 | 25 | 510 |
| 162 | 24 | 300 | 166 | 5 | 25 | 1,310 |

Example 3

Two slurries were prepared, each containing 715 grams of magnesium oxide, 874 grams of 34 percent magnesium chloride solution, 463 grams of 19 percent magnesium sulfate solution and 100 grams of water.

By the use of heating and cooling coils, both slurries were maintained at 30° C. during the course of the experiment. The control slurry was stirred sufficiently to keep the magnesium oxide in suspension, while the second slurry was stirred and received ultrasonic energy treat-

References Cited

UNITED STATES PATENTS

| | | | |
|---|---|---|---|
| 2,253,730 | 8/1941 | Seailles | 264—23 |
| 2,295,294 | 9/1942 | Ross | 204—157.1 |
| 2,351,641 | 6/1944 | Sohl et al. | 106—106 |
| 2,407,462 | 9/1946 | Whiteley | 204—157.1 |
| 2,526,837 | 10/1950 | Woodward | 106—105 |
| 2,876,083 | 3/1957 | Prietl | 204—157.1 |
| 3,184,400 | 5/1965 | Magnus | 204—193 |
| 3,309,438 | 3/1967 | Bergstein et al. | 264—69 |

TOBIAS E. LEVOW, *Primary Examiner.*

S. E. MOTT, *Assistant Examiner.*